No. 619,913. Patented Feb. 21, 1899.
H. TANNER.
LUGGAGE CARRIER FOR BICYCLES, &c.
(Application filed Oct. 10, 1898.)
(No Model.)
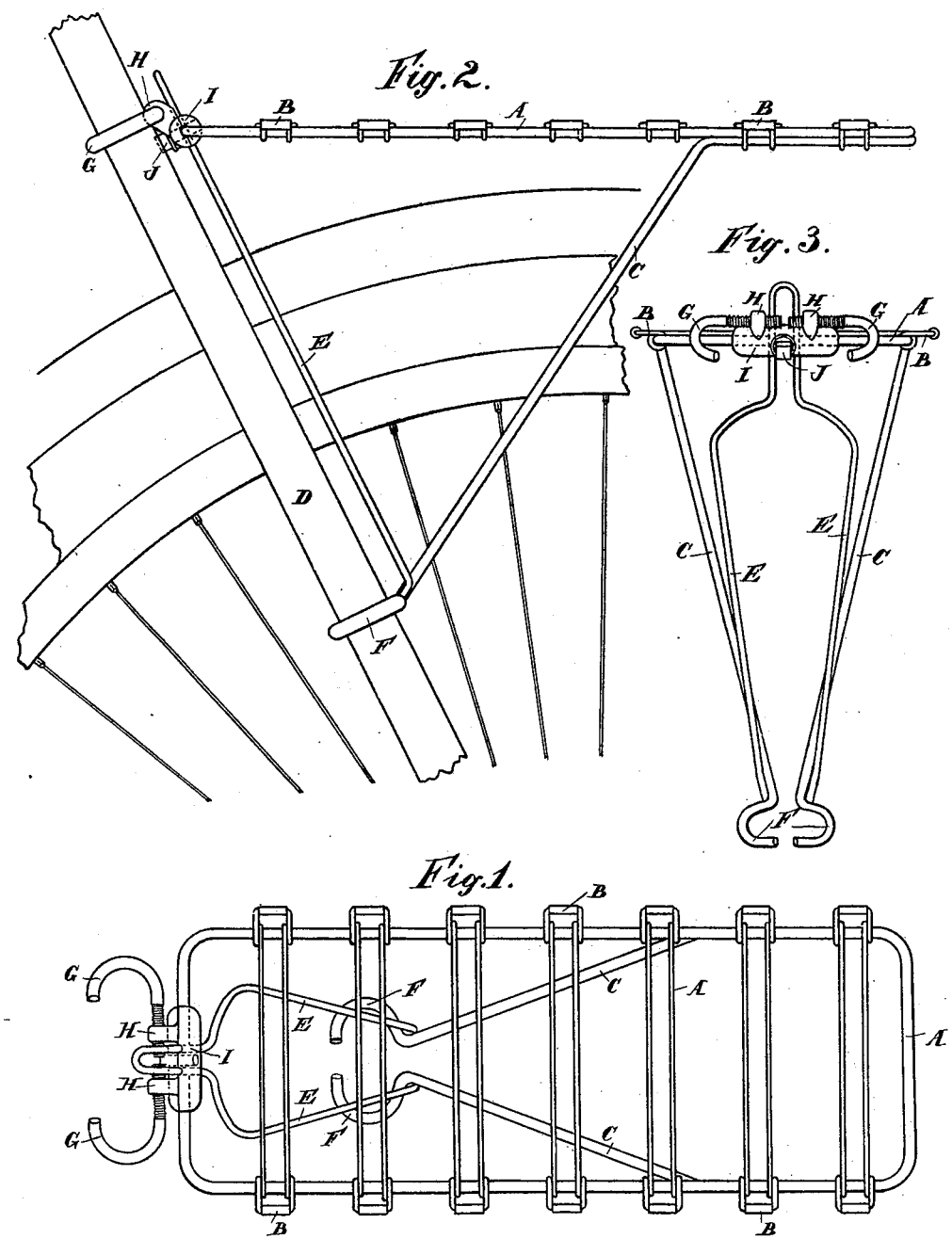
Witnesses.
William Henry Beck
Stephen Edward Gunyon
Inventor.
Herbert Tanner

UNITED STATES PATENT OFFICE.

HERBERT TANNER, OF LONDON, ENGLAND.

LUGGAGE-CARRIER FOR BICYCLES, &c.

SPECIFICATION forming part of Letters Patent No. 619,913, dated February 21, 1899.

Application filed October 10, 1898. Serial No. 693,167. (No model.)

*To all whom it may concern:*

Be it known that I, HERBERT TANNER, fellow of the Royal College of Surgeons of England, a subject of the Queen of Great Britain, residing at 1 Devonshire road, South Lambeth, London, in the county of Surrey, England, have invented certain new and useful Improvements in Luggage-Carriers for Bicycles, &c., (for which I have applied for a patent in England, dated March 28, 1898, No. 7,462, and in France, dated September 24, 1898;) and I do hereby declare the following to be a full, clear, and exact description of the invention, such as will enable others skilled in the art to which it appertains to make and use the same.

This invention relates more especially to supports for carrying luggage or other articles on bicycles and the like which are connected to the back part of the frame of the bicycle or other like vehicle and project backward over the hind wheel; but the improvements are also more or less applicable to supports for the same purpose when applied to other parts of such vehicles.

In order that the said invention may be fully understood, I will now proceed to describe the same with the aid of the accompanying drawings, in which—

Figure 1 is a plan view of a support constructed in accordance with my invention; Fig. 2, a side elevation showing the support applied to the back part of the frame of a bicycle, and Fig. 3 a back view of the support detached from the bicycle.

According to my present invention I make the support of metallic wire or other suitable material, the upper part or platform A, which is intended to occupy when applied to the vehicle a more or less horizontal position and on which the luggage or other article to be carried is strapped or otherwise secured, being preferably formed as a flat wire frame or platform provided with loops B or other appliances for the ready attachment of straps or other fastening means. This wire frame or platform A is provided at or near its rear end with stays C, which abut at their lower ends against the lower part of the backstays or fork D and are stayed to the other or front end of the wire frame by suitable stays E, which are preferably adjustable as to length, so as to enable the aforesaid wire frame or platform A to be placed more or less horizontally whatever may be the rake of the backstays or fork D to which it is to be attached.

The lower ends of the above-mentioned stays C are provided with hook-like parts F, preferably covered with india-rubber or other soft material, so as not to injure the enamel of the parts they come in contact with and adapted to hook onto the sides of the branches of the backstays or fork D. The said stays C are so made that their lower ends, where the hook-like parts F are placed, have a tendency to spring toward each other, so that when such hook-like parts are placed on the branches of the backstays or fork D they are pressed firmly against the same by the said tendency to spring together. The end of the wire frame or platform A opposite to that at which the aforesaid stays are placed is also provided with hook-like parts G, preferably covered with india-rubber or other soft material and adapted to take onto the upper part of the branches of the backstays or fork D.

It will now be understood that the support is connected to the frame of the vehicle by simply hooking it onto the upper part of the backstays or fork or other suitable member of such frame. When the member to which the support is hooked is the backstays or fork, the downwardly-diverging shape of the branches of such stays or fork prevents the hooks G of the support descending on such branches below the point at which they become tightly engaged against such branches, and to enable the hooks G to be adjusted to suit various widths and rakes of such forks they are screwed into or are otherwise adapted to swivel in lugs H or other suitable parts fixed directly or indirectly to or formed with the wire frame or platform A of the support.

The aforesaid adjustable stays E between the lower ends of the stays C and the end of the wire frame or platform A may be made adjustable by being passed through a suitable clamp I on the said frame, the said clamp being tightened up on the frame and on the stays E by a clamping-screw J.

Instead of the flat frame or platform A being made of wire it may be made of sheet metal or otherwise, and the various parts of the entire support may be made of any suitable shape, according to the part of the vehicle to which the support is to be attached and to suit other circumstances without departing from the nature of my invention.

When the support is intended to be adapted to suit any particular rake of backstay or other part and not to be adjustable to suit other rakes, the stays E may be fixed permanently at their upper ends to the frame or platform A, the adjustment in the clamp I being in that case dispensed with.

It will be understood that the above-described support can be applied to or removed from a vehicle with very great facility and without the use of any tools whatever.

I claim—

1. In combination, the platform A, the stays C attached to the outer portion thereof and having hooked parts F at their lower ends, the laterally-adjustable hook-like parts G at the inner end of the platform adapted to a part of the frame and the stays E extending from the lower parts of the stays C to the inner part of the platform A, substantially as described.

2. In combination, the platform A, the stays C attached to the outer portion thereof and having hooked parts F at their lower ends, the laterally-adjustable hook-like parts G at the inner ends of the platform adapted to a part of the frame, the stays E extending from the lower parts of the stays C to the inner part of the platform A, and the clamp I at the inner end of the platform A for holding the upper ends of the stays E adjustably, substantially as described.

In witness whereof I have hereunto set my hand in presence of two witnesses.

HERBERT TANNER.

Witnesses:
WILLIAM HENRY BECK,
STEPHEN EDWARD GUNYON.